(12) United States Patent
Yeh

(10) Patent No.: US 6,213,444 B1
(45) Date of Patent: Apr. 10, 2001

(54) VIBRATION DAMPER

(75) Inventor: David Yeh, Taipei (TW)

(73) Assignee: United Silicon Incorporated, Hsinchu (TW)

( * ) Notice: Subject to any disclaimer, the term of this patent is extended or adjusted under 35 U.S.C. 154(b) by 0 days.

(21) Appl. No.: 09/266,660

(22) Filed: Mar. 11, 1999

(51) Int. Cl.$^7$ ............................... F16M 13/00; E04B 1/98
(52) U.S. Cl. ......................... 248/562; 52/167.8; 248/679
(58) Field of Search ........................... 248/562, 346.01, 248/679, 672, 673, 618, 581, 560, 632, 633, 634, 637, 638; 108/51.1, 56.1; 52/167.3, 167.4, 636, 638, 167.8

(56) References Cited

U.S. PATENT DOCUMENTS

| | | | |
|---|---|---|---|
| 2,210,051 | * 8/1940 | Woodbury | 248/562 |
| 2,441,509 | * 5/1948 | Robinson | 248/634 |
| 3,190,041 | * 6/1965 | Kimball | 248/679 |
| 3,334,850 | * 8/1967 | Jackson et al. | 248/679 |
| 3,469,809 | * 9/1969 | Reznick et al. | 248/562 |
| 4,700,923 | * 10/1987 | Lewis, Jr. et al. | 248/679 |
| 5,054,251 | * 10/1991 | Kemeny | 52/167.8 |
| 5,277,395 | * 1/1994 | Smith et al. | 248/679 |

* cited by examiner

Primary Examiner—Anita M. King

(57) ABSTRACT

A vibration damper is described. A vibration damper with a high dampening ability is required for a scanner because of the requirement of the 0.18 $\mu$m size devices. The vibration damper is placed between a machine and a floor. The vibration damper has an I-shaped girder structure and a material filling the space between the floor and I-shaped girder structure. A support element having two layers of latticed armatures is mounted on the I-shaped girder structure. The support element is filled with cement. A layer of vibration absorber is placed on the cement.

21 Claims, 3 Drawing Sheets

VIBRATION DAMPER

BACKGROUND OF THE INVENTION

1. Field of the Invention

The invention relates in general to a vibration damper, and more particularly to a vibration damper on which a scanner can be mounted.

2. Description of the Related Art

New methods for achieving high resolution of photolithography are continually developed to manufacture devices with higher precision, as semiconductor are increasingly integrated. In the future, scanners are expected to become mainstream technology because of the requirements of 0.18 μm size devices. Therefore, the dampening ability of the vibration damper has to increase as well. The required vibration damper prevents floor vibrations from disturbing the scanner and avoids the force produced by the scanner, which the scanner can't disperse and which may affected the next exposure step of the scanner.

Semiconductor manufactory floors are metal grids or have holes in them to to facilitate the connections of several kinds of culverts in the manufactories. Therefore, these floors are less dense than solid, flat floors. When a scanner is mounted on such a floor, it is necessary that the vibration damper be light, since the scanner itself already weighs about 7200 kg.

The conventional vibration damper is a steel baseplate with a simple structure that has a poor damping ability. Therefore, the conventional vibration damper is only suitable for processes with low precision requirements and is not suitable for devices with sizes less than 0.1 μm because of its poor damping ability. The improved vibration damper is composed of ferroconcrete so that the vibration-proof ability is improved. However, this type of vibration damper is at least 2000 kg heavier than the scanner, and the floors of the manufactories cannot bear that much weight. Therefore, the conventional vibration damper does not meet the actual requirements of the processes. A need exists for an improved damper.

SUMMARY OF THE INVENTION

The invention achieves the above-identified object by providing a vibration damper between a semiconductor manufacturing machine and a floor. The vibration damper has an 1-shaped girder structure and a material filling the space between the floor and I-shaped girder structure. A support element having two layers of latticed armatures is mounted on the I-shaped girder structure. The support element is filled with cement. A layer of vibration absorber is placed on the cement.

The total weight of the vibration damper does not exceed 3000kg due to the use of simple materials. The vibration damper of the invention has high vibration-proof ability.

DESCRIPTION OF THE PREFERRED EMBODIMENT

Figure 1:
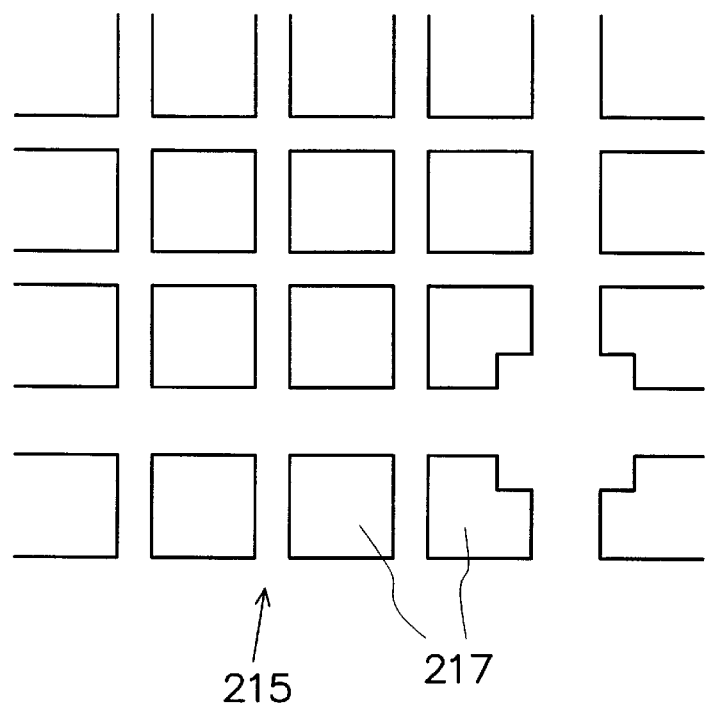
FIG. 1 is a schematic, top view showing a floor with a grid.
Figure 2:
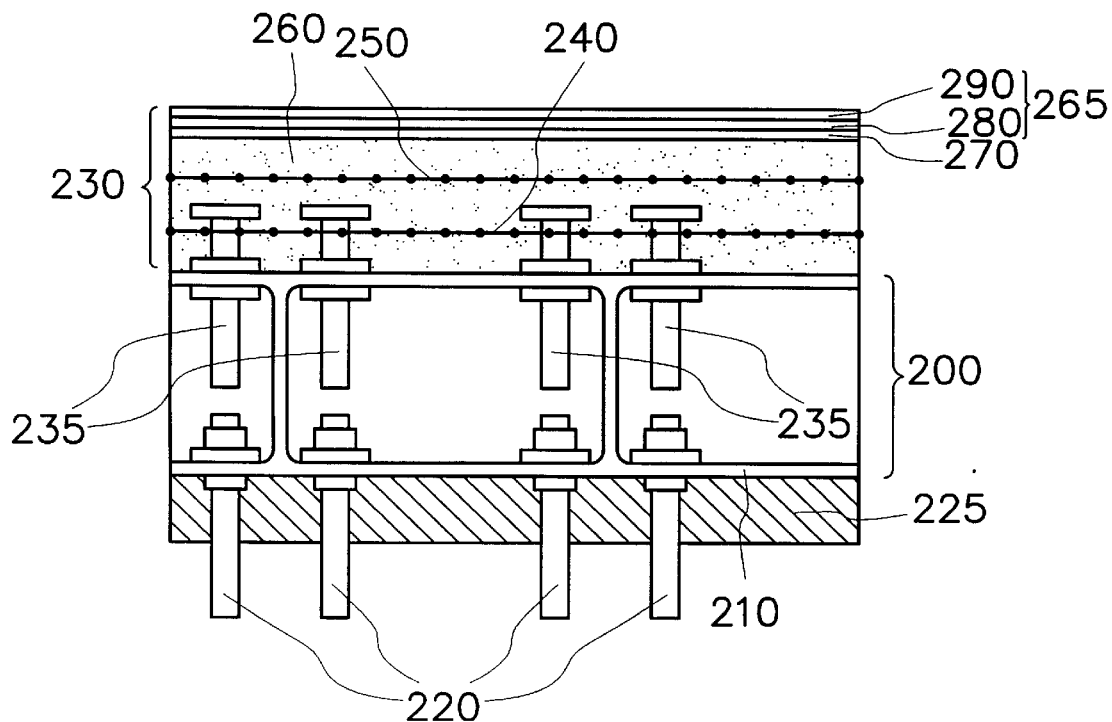
FIG. 2 is a schematic, cross-sectional view showing a vibration damper of one preferred embodiment of the present invention.
Figure 3:
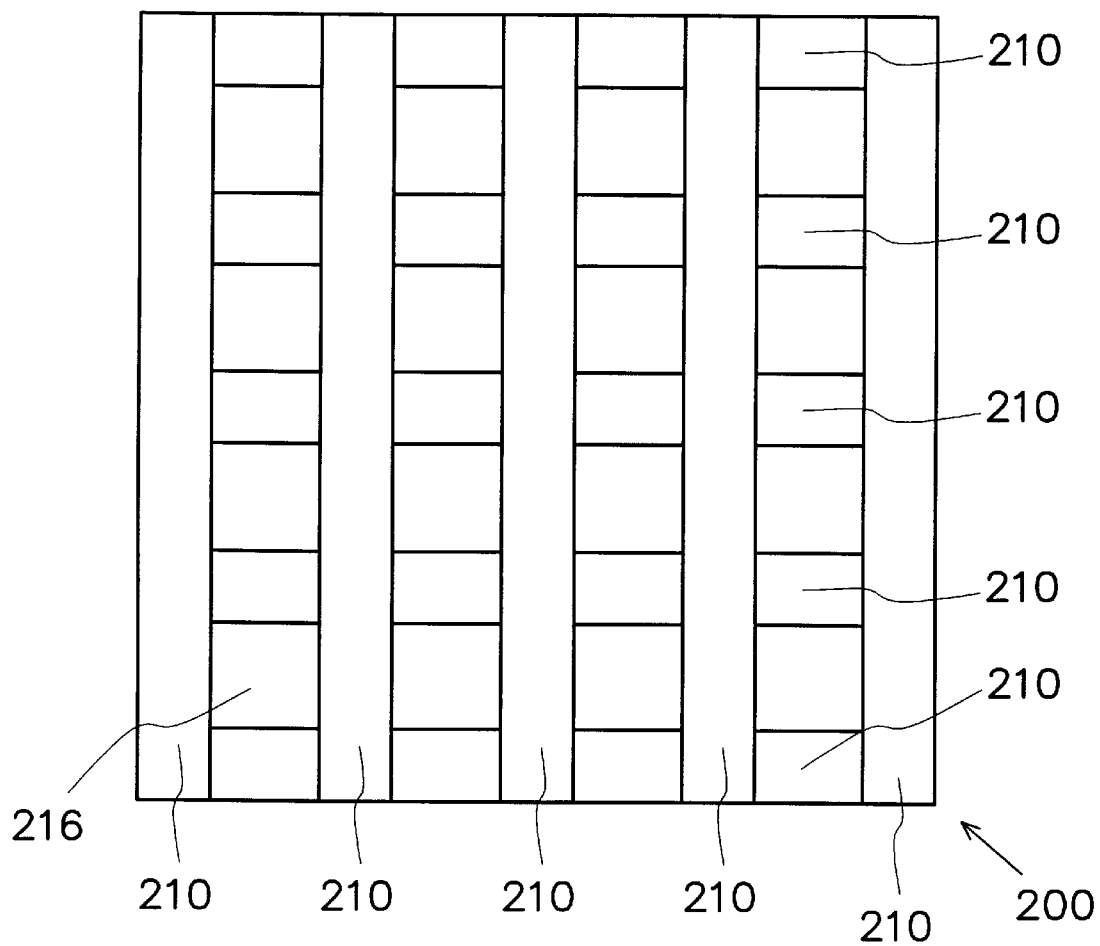
FIG. 3 is a schematic, top view showing a vibration damper with I-shape.

Referring to FIGS. 1 through 3 simultaneously, an I-shaped girder structure 200 is mounted on the bottom region of a vibration damper. The I-shaped girder structure 200 is composed of an I-shaped girder 210 with dimensions of about 200 mm×200 mm×12 mm. The I-shaped girder structure 200 includes a square, hollow region 216 with a length of about 300 mm to 600 mm and a width of about 350 mm to 550 mm. The I-shaped girder structure 200 is mounted on a latticed girder 215 with a width of about 250 mm to 650 mm. The latticed girder 215 includes a square hollow region 217 with dimensions of about 900 mm×900 mm. Both the I-shaped girder structure 200 and latticed girder 215 are lattices; hence, a chemical plug 220, for example, M 24, can be used in the overlay region between the structure 200 and latticed girder 215 to them to each other. The position of the I-shaped girder structure 200 can be adjusted to be level and have a distance of about 50 mm from the latticed girder 215. The overlay region between the I-shaped (girder structure 200 and latticed girder 215 is filled with a material 225, for example, epoxy, with a compressive modulus of about 200000 psi to 400000 psi and a tensile strength of about 7000 psi to 14000 psi.

Figure 5:
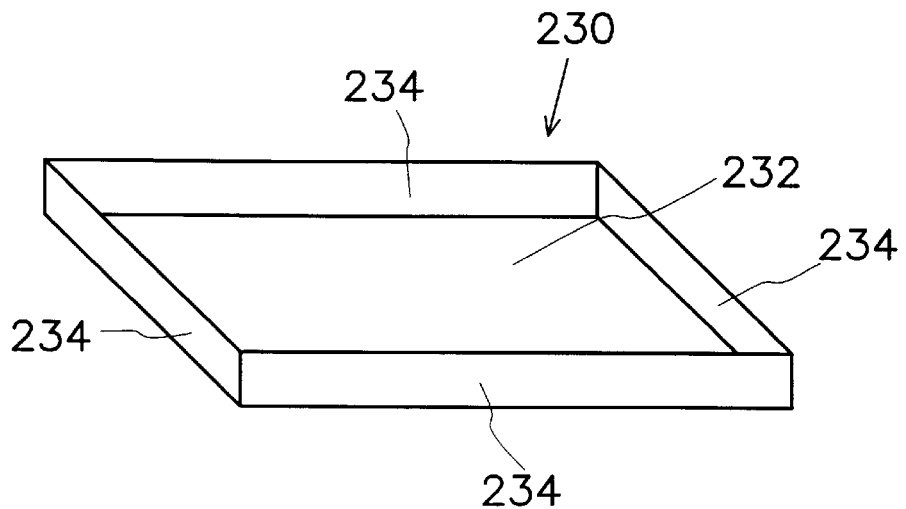
FIG. 5 is a schematic, perspective view showing a support element for the vibration damper according to the preferred embodiment of the present invention.

Referring to FIGS. 2 and 5, a support element 230 made of, for example, stainless steel, is mounted on the I-shaped girder structure 200. The support element 230 includes a bottom surface 232 that is smaller than the I-shaped girder structure 200 and a sidewall 234 with a height of about 150 mm which is perpendicular to and surrounds the bottom surface 232. The support element 230 supports an armature, cement and several interfacial materials. Spot welding and plugs 235 with dimensions of about M16×300 are applied to the contact portions between the support element 230 and the I-shaped (girder structure 200.

Figure 4:
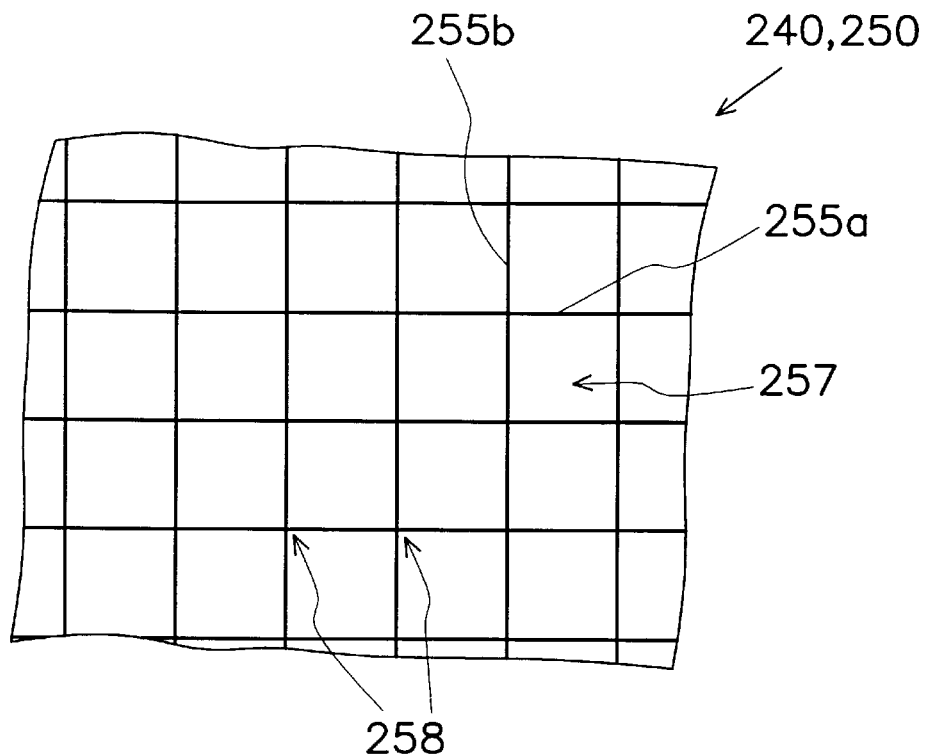
FIG. 4 is a schematic, top view showing an armature structure for the vibration damper according to the preferred embodiment of the present invention.

Referring first to FIGS. 2, 4 and 5, latticed armatures 240 and 250 are mounted inside the support element 230. The latticed armatures 240 and 250, composed of transversal bars 255a and longitudinal bars 255b with dimensions of about φ6×6, are placed in the support element 230, so that they lie over the bottom surface and each other but are separated from the bottom surface and each other by a distance. The transversal bars 255a and longitudinal bars 255b together form grids 257 with openings having dimensions of 150 mm×150 mm. The grids are spot welded at the contact portions 258 to increase the strength of the latticed armatures 240 and 250. The contact portions between the latticed armatures 240 and 250 and support element 230 are also spot welded for further structural strength. The plugs 235 pass through the latticed armature 240 to increase the stress capability when the support element 230 is filled with cement.

Referring to FIG. 2, the support element 230 is then filled with cement 260 with a hardness of about 7000 psi to 14000 psi to absorb the vibration.

A layer of vibration absorber 265 is formed on the cement 260. An interfacial layer 270 is formed between the cement 260 and vibration absorber 265 to attach vibration absorber 265 to the cement 260. The vibration absorber 265 is composed of epoxy-containing materials, for example, material 280 with a high hardness and material 290 with a low hardness, wherein the material 290 has a compressive modulus of about 200000 psi to 400000 psi and a tensile strength of about 7000 psi to 14000 psi. The total weight of the vibration damper does not exceed about 3000kg. The vibration damper absorb vibrations when manufacturing wafers in the semiconductor processes. Therefore, several semiconductor processes can be performed on wafers by utilizing the vibration damper.

The vibration damper can be used with the scanner only after a test process is passed. The test data of the vibration damper fabricated according to the present invention are listed as shown in table 1:

TABLE 1

| Hardness ($10^8$N/m) | Standard hardness value | Vibration Damper of the invention | One of the conventional Vibration Dampers | Another one of the conventional Vibration Dampers |
|---|---|---|---|---|
| Perpendicular position | 1 | 4.6~7.7 | 2 | 5 |
| Horizontal position | 1 | 14~16 | 2 | 5 |

As shown in table 1, the hardness of the vibration damper is much higher than the standard value and several times higher than the hardness of conventional vibration dampers. The hardness values of the vibration damper in the present invention passes the test even when only one test step is applied.

As described in the embodiment of the invention, the invention has advantages as follows:

1. The total weight of the vibration damper does not exceed 3000 kg due to the use of simple materials.

2. The hardness values in perpendicular and horizontal positions of the vibration damper according to the present invention are about 4.6~7.7×$10^8$ N/m and 14~16×$10^8$ N/m, respectively. Therefore, the vibration damper has high damping ability.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A vibration damper, placed on a position between a machine and a floor, comprising:
    an I-shaped girder structure;
    a first material filling a space between the I-shaped girder structure and the floor;
    a support element fixed on the I-shaped girder structure by spot welding;
    a first latticed armature structure mounted in one plane within the support element;
    a second latticed armature structure mounted in another plane within the support element and on the first latticed armature structure;
    cement filling the support the element; and
    a vibration absorber attached to the cement.

2. A vibration damper according to claim 1, wherein the I-shaped girder structure includes a plurality of I-shaped girders with dimensions of about 200 mm×200 mm×12 mm.

3. A vibration damper according to claim 1, wherein the first material includes a compressive modulus of about 200000 psi~400000psi and a tensile strength of about 7000 psi~14000 psi.

4. A vibration damper according to claim 1, wherein the support element includes stainless steel.

5. A vibration damper according to claim 1, wherein the support element comprises:
    a bottom surface; and
    a sidewall placed around and perpendicular to the bottom surface.

6. A vibration damper according to claim 5, wherein the bottom surface is smaller than the I-shaped girder structure.

7. A vibration damper according to claim 5, wherein the sidewall has a height of about 150 mm.

8. A vibration damper according to claim 1, wherein the support element is attached to the I-shaped girder structure by a plurality of plugs applied to points of contact between the support element and the I-shaped girder structure.

9. A vibration damper according to claim 8, wherein the plugs have dimensions of about M16×300.

10. A vibration damper according to claim 1, wherein the first and second latticed armature structures include a plurality of transverse and longitudinal bars.

11. A vibration damper according to claim 10, wherein the transverse and longitudinal bars constitute a plurality of grids having openings with dimensions of about 150 mm×150 mm.

12. A vibration damper according to claim 10, wherein the transverse and longitudinal bars are connected together by spot welds and the ends of the transverse and longitudinal armatures and the sidewall of the support element are connected by spot welds.

13. A vibration damper according to claim 10, wherein the transverse and longitudinal bars have dimensions of about φ6×6.

14. A vibration damper according to claim 10, wherein a plurality of plugs have a height higher than the first latticed armature structure so as to pass through a plane of the first latticed armature structure.

15. A vibration damper according to claim 1, wherein the cement includes a hardness of about 7000 psi~14000 psi.

16. A vibration damper according to claim 1, wherein the vibration absorber includes epoxy.

17. A vibration damper according to claim 1, wherein the vibration absorber comprises:
    a second material; and
    a third material mounted on the second material.

18. A vibration damper according to claim 17, wherein the third material includes a compressive modulus between about 200000 psi and 400000psi and a tensile strength between about 7000 psi and 14000 psi.

19. A vibration damper according to claim 17, wherein the second material is harder than the third material.

20. A vibration damper according to claim 1, wherein the vibration absorber is attached to the cement by an interfacial material.

21. A vibration damper according to claim 1, wherein the total weight of the vibration damper does not excess 3000 kg.

* * * * *